UNITED STATES PATENT OFFICE.

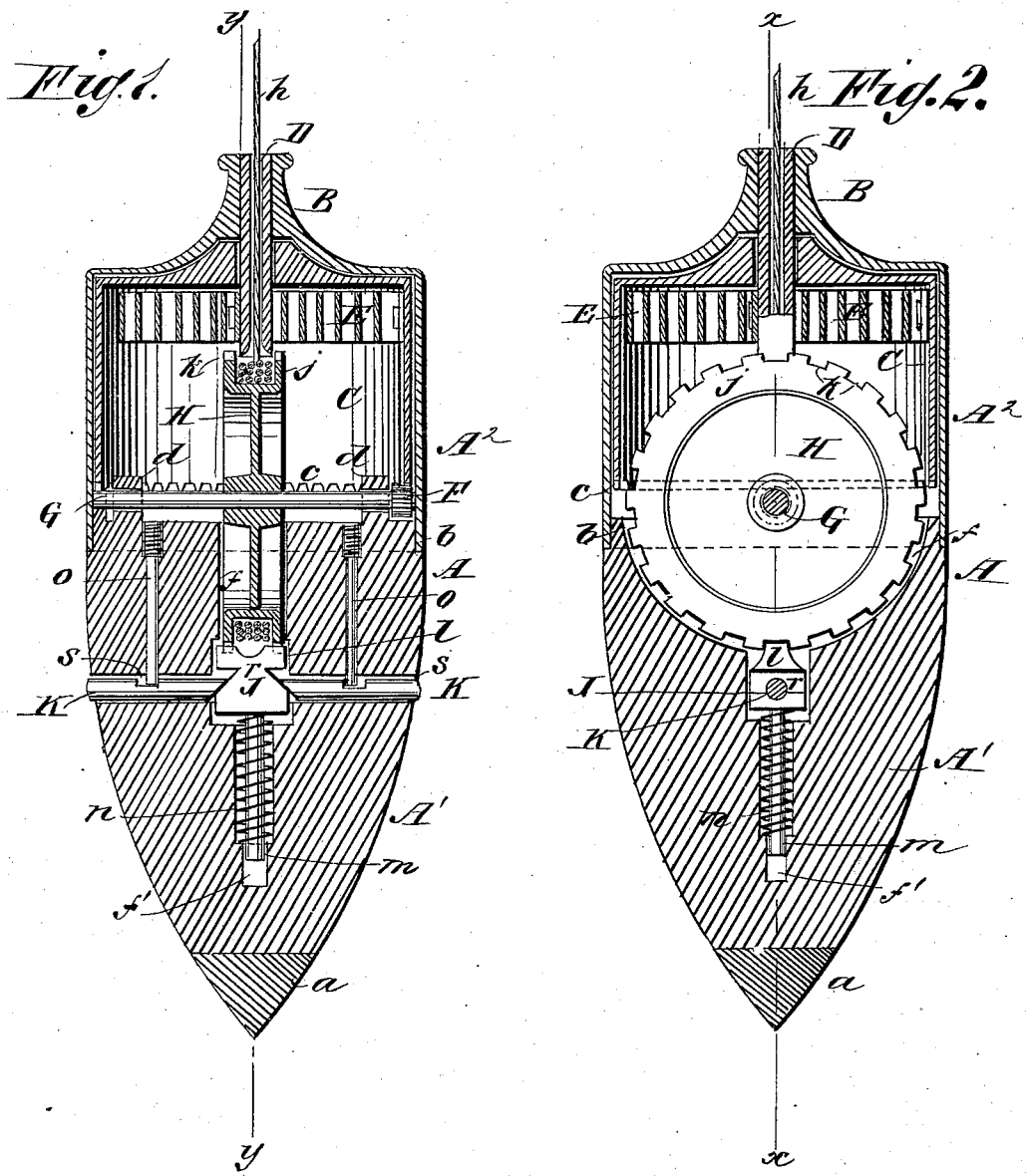

GEORGE MORRISON, OF ELMIRA, NEW YORK.

PLUMB-BOB.

SPECIFICATION forming part of Letters Patent No. 305,951, dated September 30, 1884.

Application filed February 28, 1884. (No model.)

*To all whom it may concern:*

Be it known that I, GEORGE MORRISON, of Elmira, in the county of Chemung and State of New York, have invented a new and Improved Plumb-Bob, of which the following is a full, clear, and exact description.

The object of my invention is to provide a plumb-bob having a mechanism for automatically winding the suspension-cord within the bob.

My invention consists in a plumb-bob containing in its upper hollow portion a spring-barrel gearing with a pinion on a shaft, upon which shaft a reel is mounted, which reel has its periphery notched for the engagement of a spring-pawl for holding the reel at any desired point; and my invention also consists in dogs for operating the spring-pawls to release the reel, and in various details of construction, as will be hereinafter more fully described.

Reference is to be had to the accompanying drawings, forming part of this specification, in which similar letters of reference indicate corresponding parts in both the figures.

Figure 1 is a sectional elevation of my plumb-bob on the line $x\ x$ of Fig. 2, and Fig. 2 is a sectional elevation of the same at a right angle to the section of Fig. 1 and on the line $y\ y$ of Fig. 1.

A indicates a plumb-bob, the lower portion, A', of which is solid, except as hereinafter described, and has a suitable steel point, $a$. The upper portion, $A^2$, is a cylindrical shell closed at its upper end and having a neck, B, which upper portion, $A^2$, is suitably connected to the lower portion, A', at $b$.

Within the hollow portion $A^2$ is loosely fitted a barrel, C, which barrel revolves around a hollow pin or spindle, D, fixed in the neck B, and projecting through the top or hub of the barrel C. A spring, E, in the upper part of the barrel has one end fastened to the barrel, and its other end to the pin D. The lower edge of the spring-barrel C has teeth $c$ formed in it for engagement with a pinion, F, fixed upon one end of a shaft, G, journaled in boxes $d$ on the upper surface of the portion A'.

On the shaft G at its center is fixed the reel H, which revolves partly within the barrel C, and partly in a recess, $f$, in the portion A' of the bob. In the periphery of the reel is an annular groove for receiving the suspension-cord $h$ of the bob, the sides $j$ of which are notched at $k$ to receive the tooth $l$ of a spring-pawl, J, located in the bottom of the recess $f$, and having a spindle, $m$, extending into a smaller recess, $f'$. A spiral spring, $n$, upon the spindle $m$ keeps the tooth $l$ of the pawl engaged with the notches $k$ of the reel H. Two dogs, K—one at each end of the pawl J—are fitted to move easily in apertures extending from the recess $f$ to the outer surface of the portion A', and have their inner ends beveled for engagement with beveled notches $r$ in the ends of the pawl J, whereby by pressing the outer ends of the dogs K inward the pawl J is disengaged from the notches $k$ of the reel. Short pins $o$ are secured in apertures in the portion A', and have their lower ends extending into notches $s$ in the dogs K, for limiting the movement of said dogs. Normally the cord $h$ passes through the spindle D, and is held wound on the reel H by the tension of the spring E acting by means of the teeth $c$ on the pinion F of the shaft G. By pressing inward the dogs K the pawl J is disengaged from the notches $k$ in the periphery of the reel H, and the cord may be unwound. When it is desired to rewind the cord on the reel, by again disengaging the pawl J, as before described, and allowing the cord to be slack, it is automatically rewound. The portion A' of the bob may be made hollow and filled in with lead except the spaces for that part of the mechanism contained in said portion, and the outer casing may be made of any suitable material.

This plumb-bob will be found very useful for all purposes where a bob is used. The outer end of the line can be made fast at any desired point overhead and the bob let down to exactly the required place without any waste of time in adjusting the free end of the line. When not in use, the bob can be raised up out of the way of the head of the person using it, and then by pressing on the dogs K the cord will be wound and the bob will remain suspended out of the way until again needed for use.

This bob will be found very convenient for use by masons, plumbers, mill-wrights, carpenters, surveyors, &c. The reel will contain about twenty feet of line.

Having thus described my invention, what I claim as new, and desire to secure by Letters Patent, is—

1. A plumb-bob provided with a reel for winding the cord, a spring-barrel for actuating the reel, a pawl for holding the spring-barrel, and dogs for releasing the pawl from the reel, substantially as specified.

2. A plumb-bob constructed substantially as described, and containing a reel for winding the line, a spring-barrel having teeth formed in one edge and engaging with a pinion fixed on the shaft carrying the reel, the said reel having notches formed in its periphery, a spring-pawl engaging with the notches in the reel, and dogs having beveled ends for engagement with beveled notches in the pawl, substantially as specified.

3. The combination, with the bob A, provided with a hollow spindle, D, of the spring-barrel C, having teeth c, the pinion F, the shaft G, the reel H, and a holding-pawl and releasing mechanism, substantially as specified.

4. The combination, with the bob A, the spring-barrel C, the shaft and pinion G F, and the reel H, having notches k in its periphery, of the spring-pawl J, having the beveled notches r and the tooth l, and of the dogs K, having beveled ends, substantially as specified.

5. In a plumb-bob, the hollow upper portion, $A^2$, having the neck B, in which is secured the hollow pin D, in combination with the barrel C and spring E, secured to the said barrel and hollow pin, substantially as specified.

GEORGE MORRISON.

Witnesses:
J. BINKLER,
F. DEAN.